Oct. 23, 1928.
A. STONE ET AL
1,688,901
BAG MAKING MACHINE
Filed May 16, 1927
13 Sheets-Sheet 2
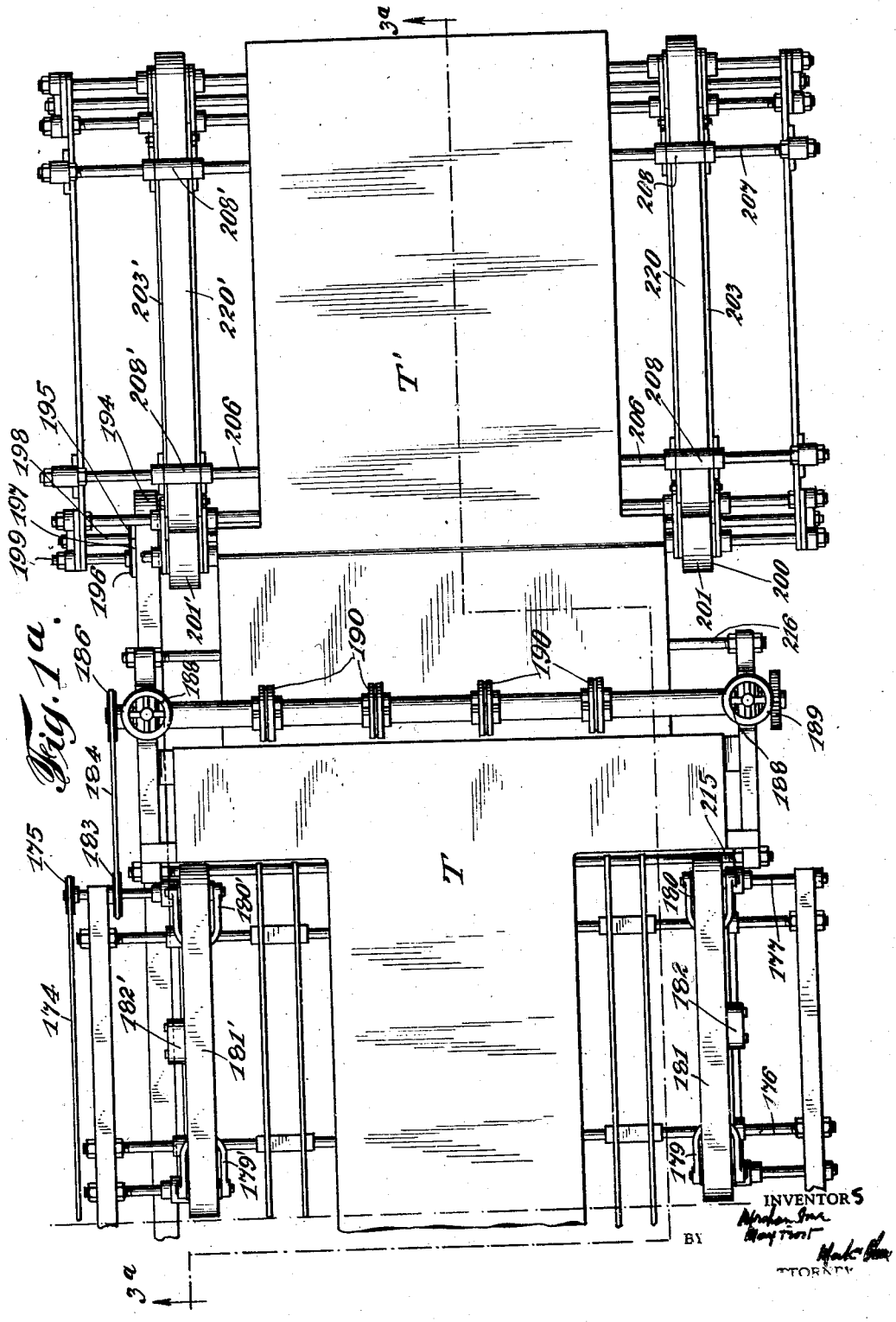

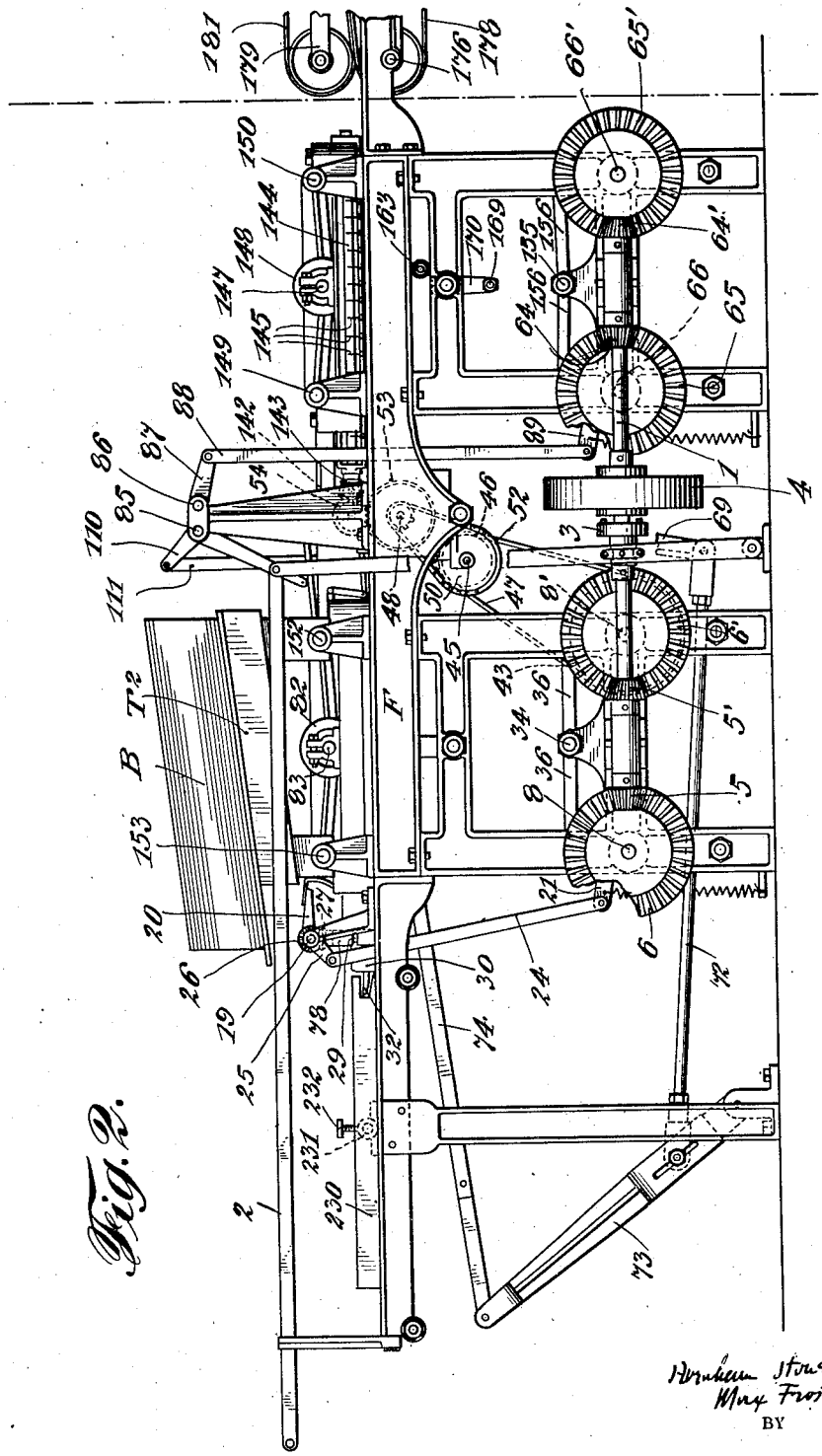

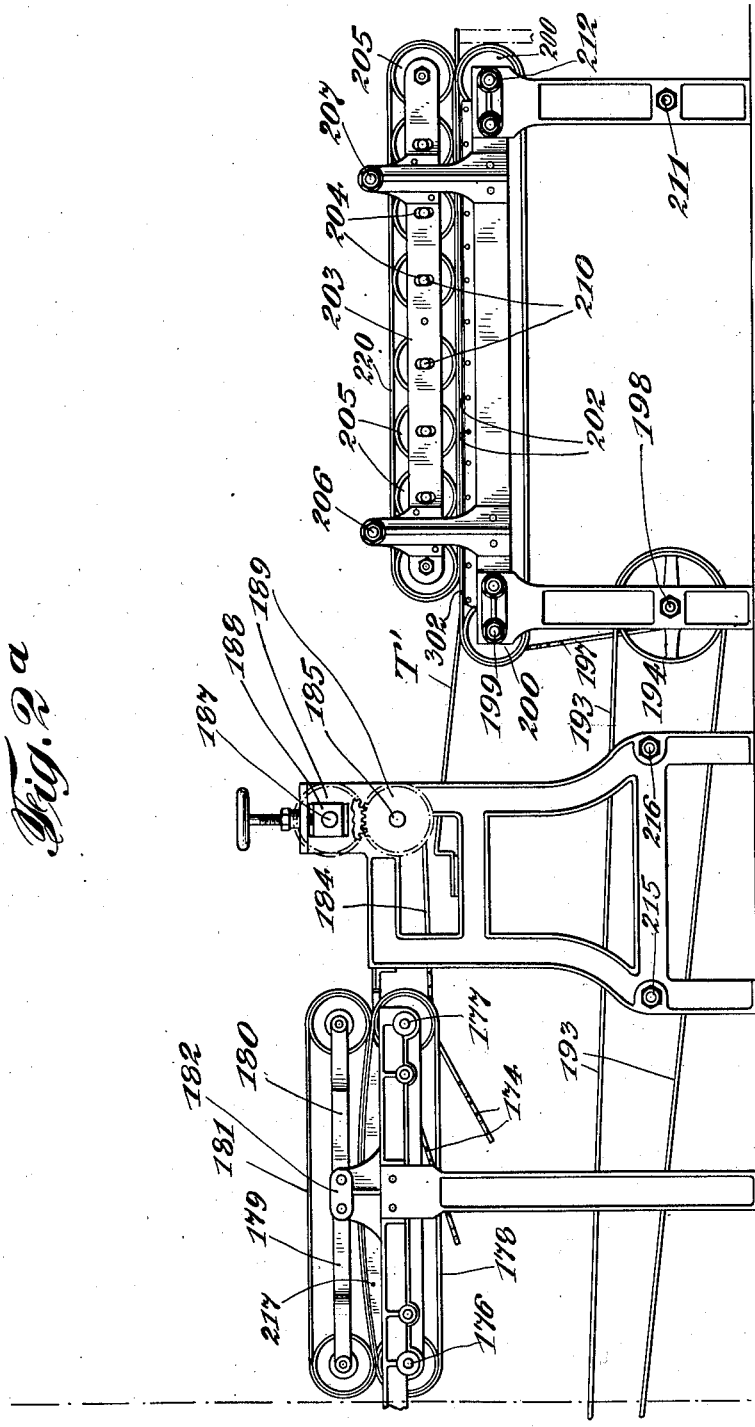
Oct. 23, 1928.
A. STONE ET AL
1,688,901
BAG MAKING MACHINE
Filed May 16, 1927   13 Sheets-Sheet 4
INVENTORS
BY
ATTORNEYS

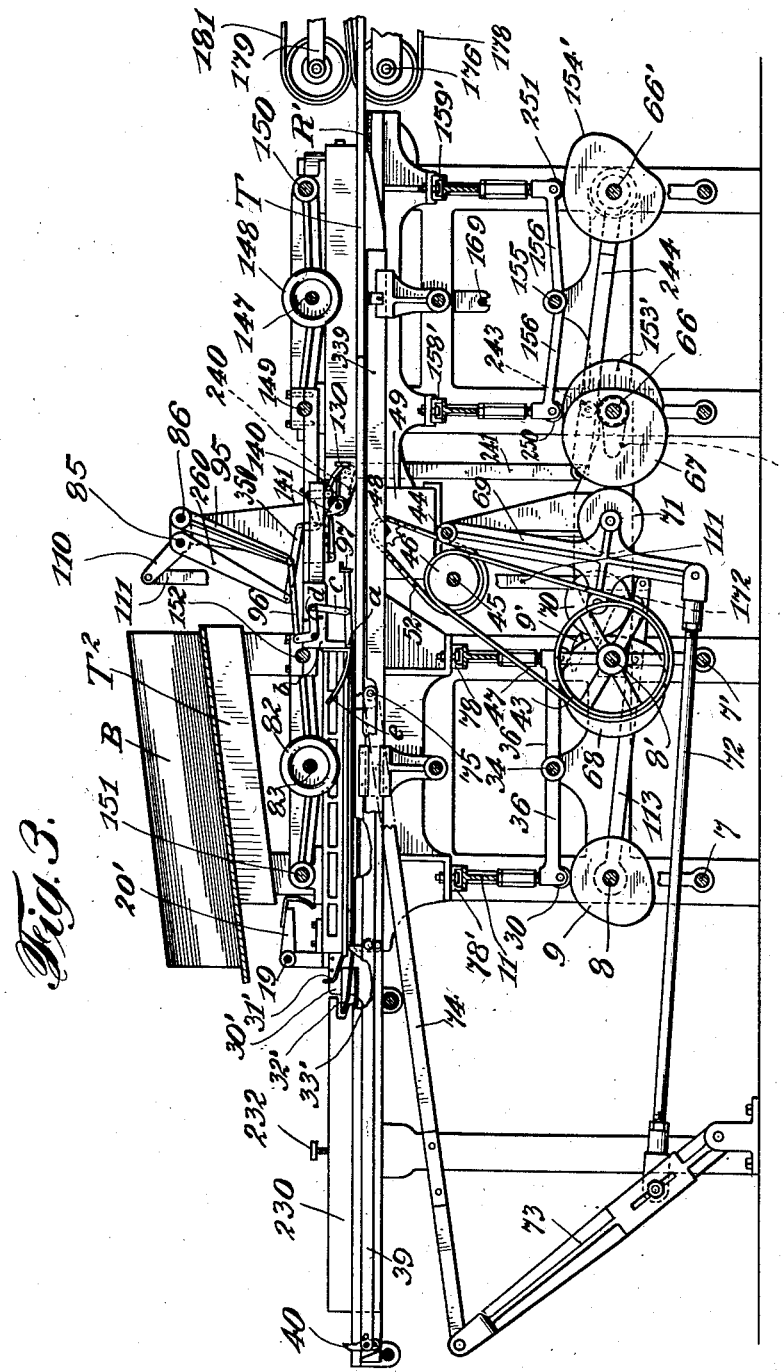

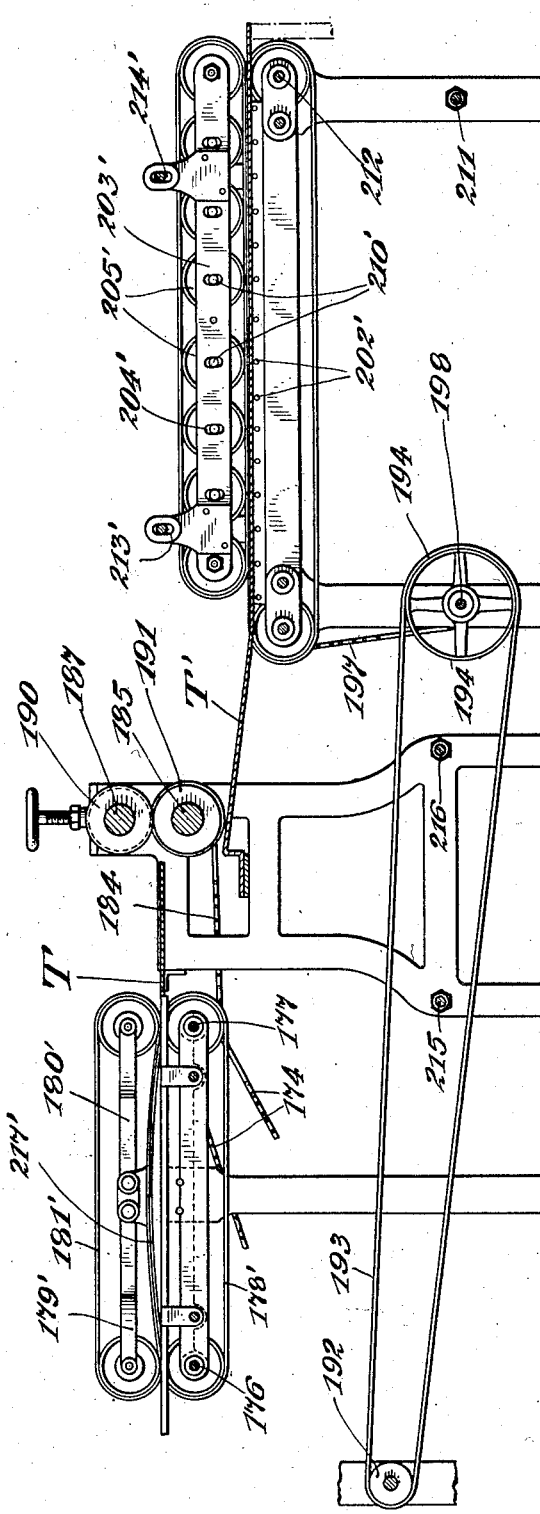

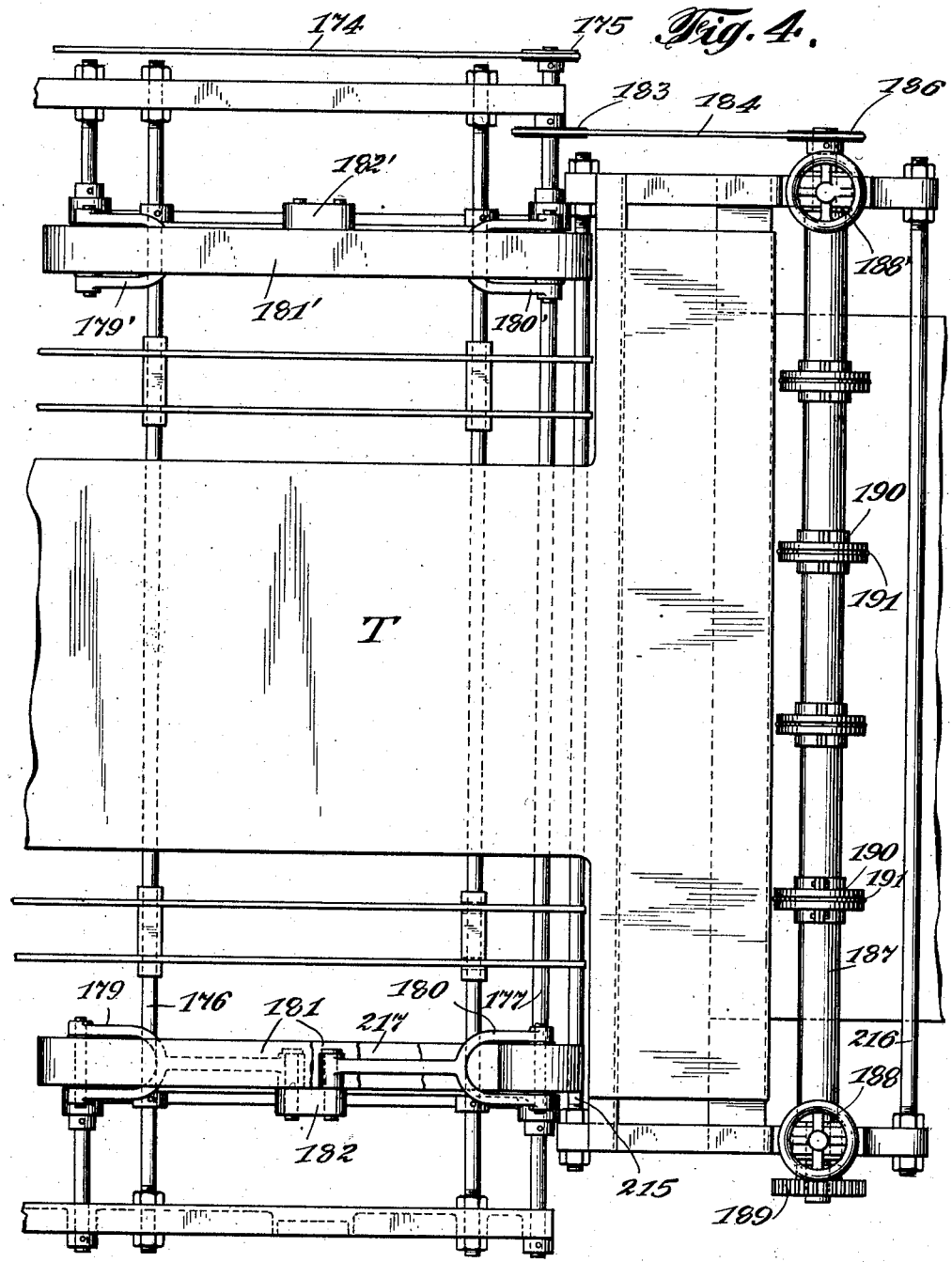

Oct. 23, 1928.

A. STONE ET AL 1,688,901

BAG MAKING MACHINE

Filed May 16, 1927

Abraham Stone
Max Frost
INVENTORS

BY Mock & Blum
ATTORNEYS

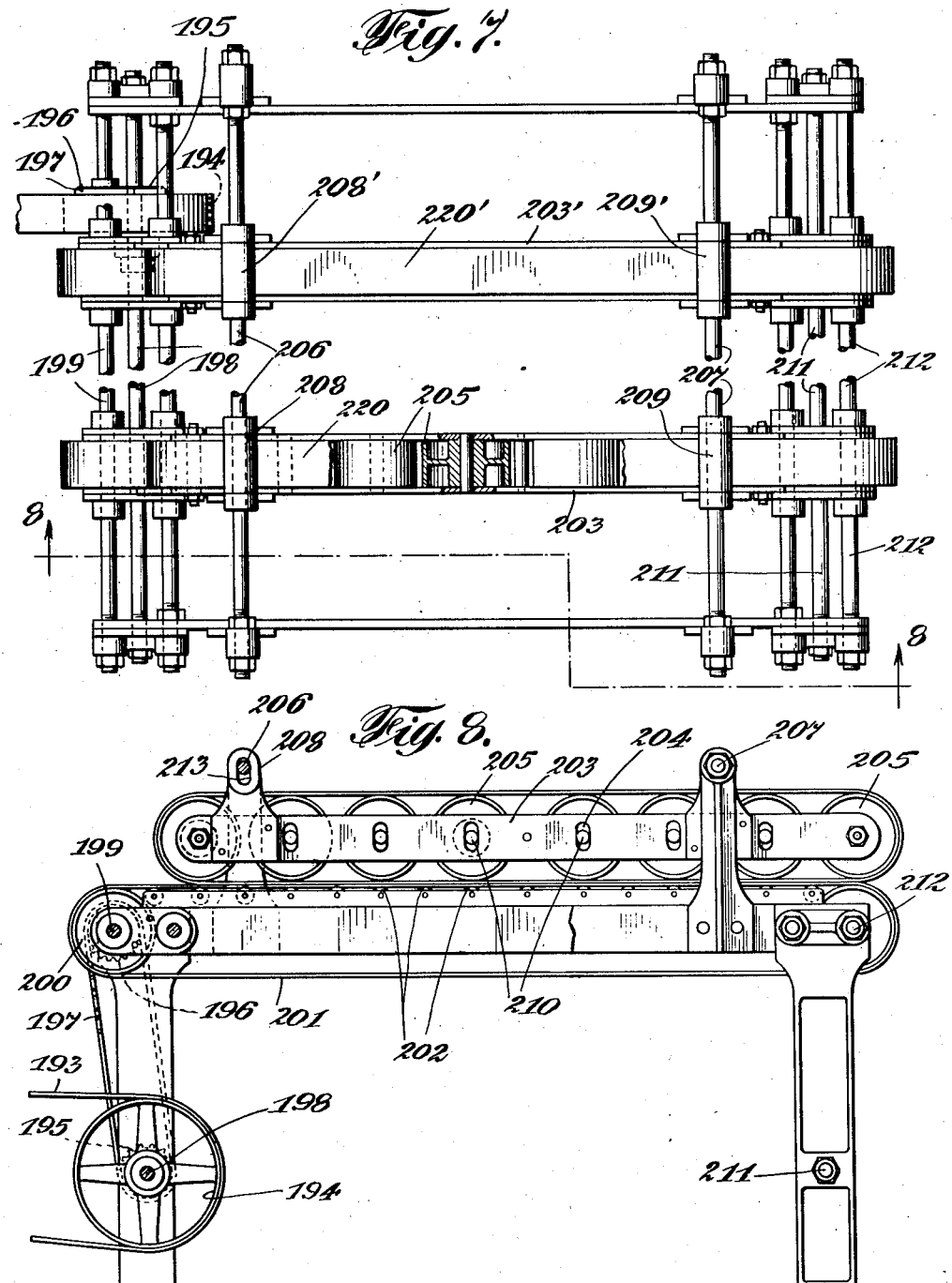

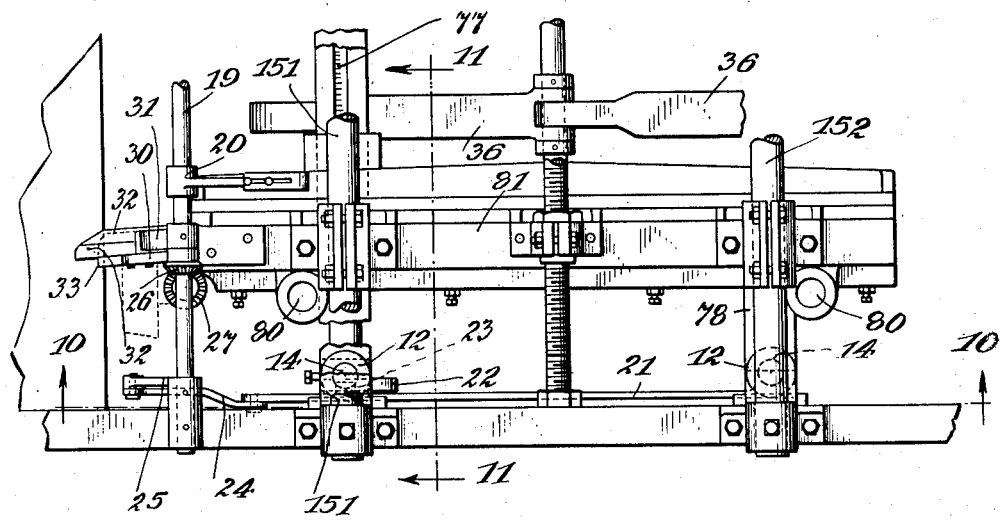
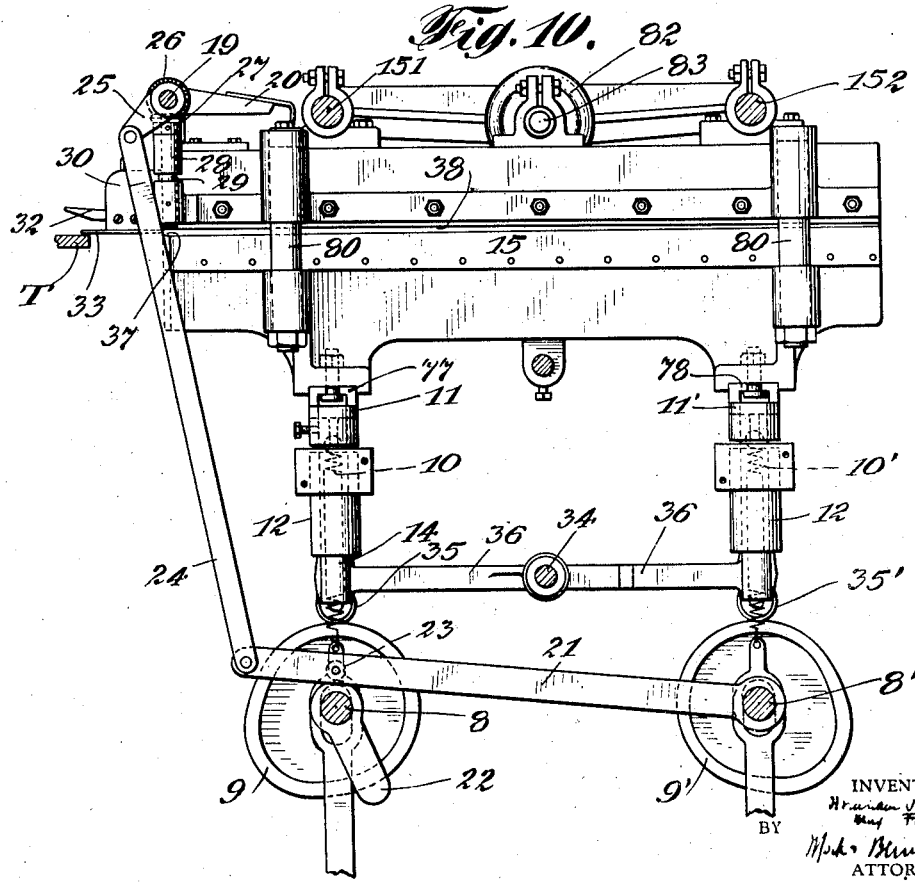

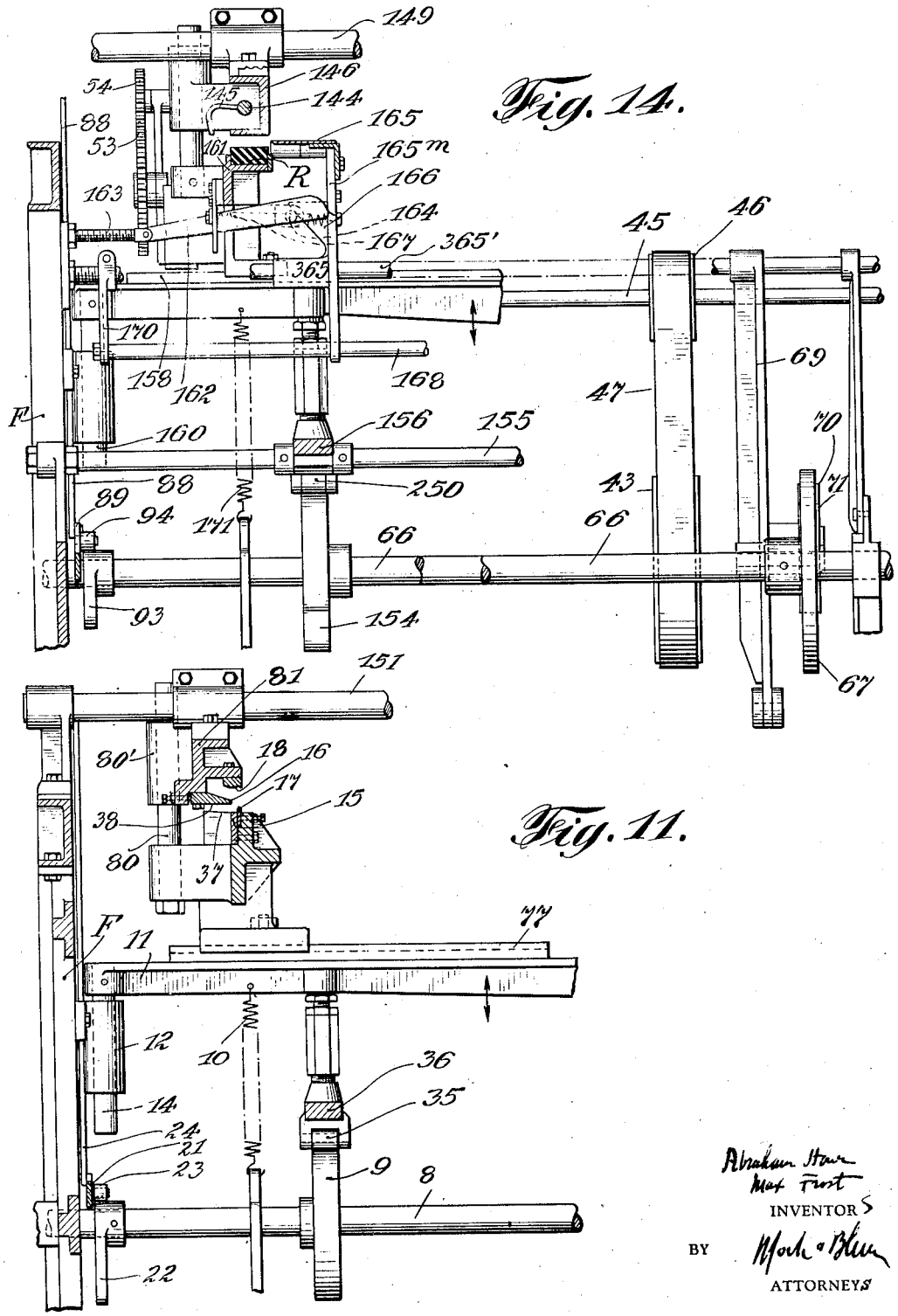

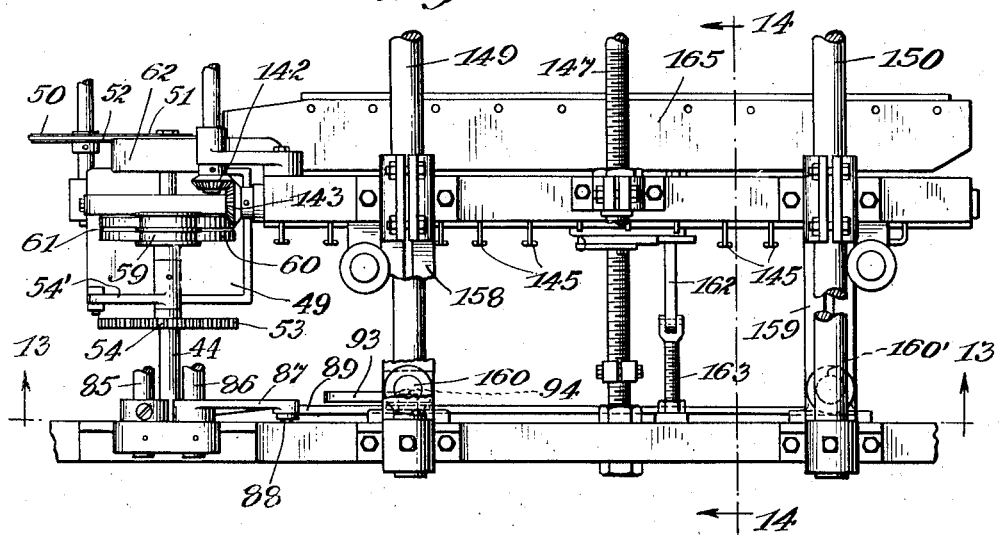
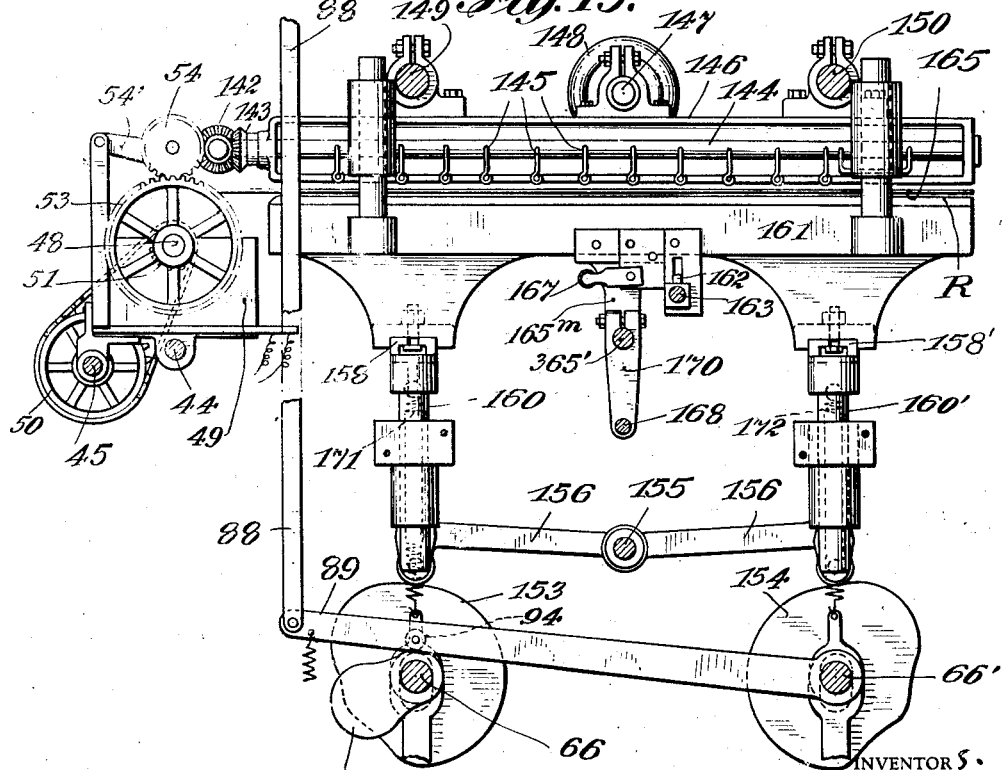

Oct. 23, 1928.
A. STONE ET AL
1,688,901
BAG MAKING MACHINE
Filed May 16, 1927    13 Sheets-Sheet 13
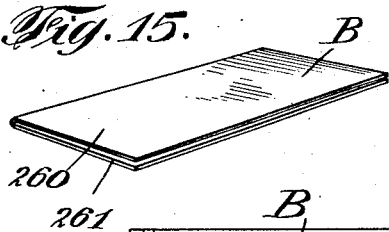
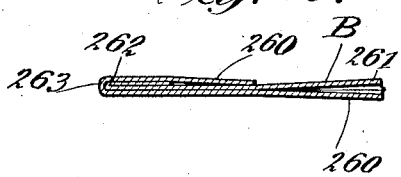
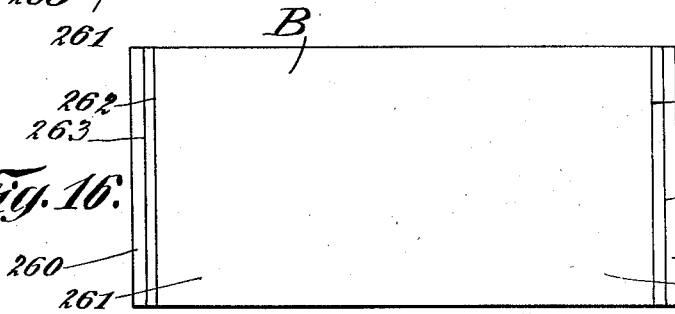
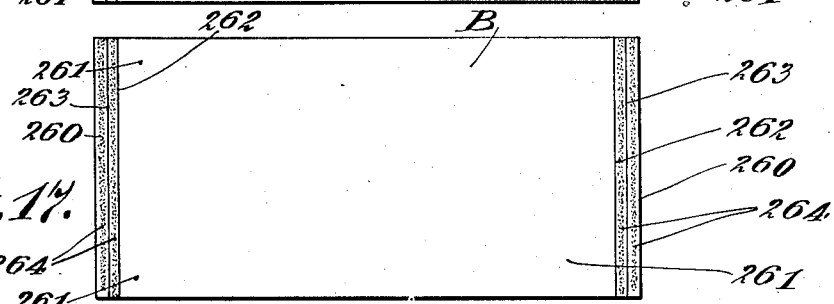
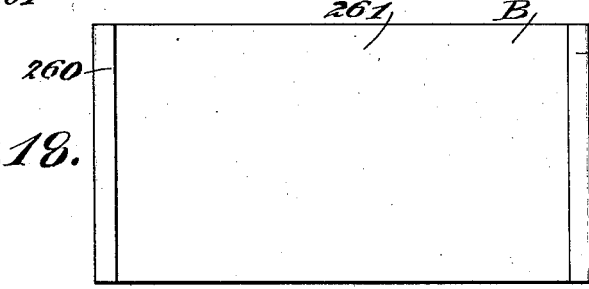
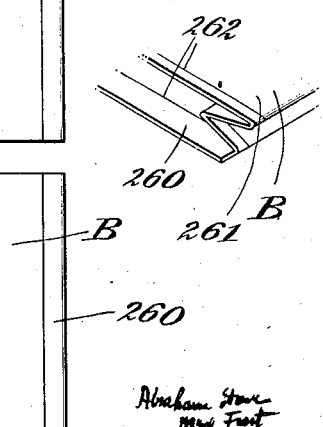
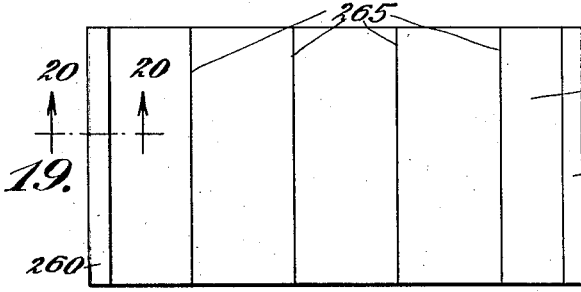
INVENTORS
BY
ATTORNEYS Patented Oct. 23, 1928.

1,688,901

UNITED STATES PATENT OFFICE.

ABRAHAM STONE AND MAX FROST, OF BROOKLYN, NEW YORK.

BAG-MAKING MACHINE.

Application filed May 16, 1927. Serial No. 191,730.

Our invention relates to a new and improved machine for making bags.

One of the objects of our invention is to provide a machine for making bags of stiff paper, of the type used as "moth-proof" bags for packing garments.

Another object of our invention is to provide a machine which will take a suitable blank open at one side and at the edges thereof, and will fold over and glue the edges to the body of the blank, to produce a side opening garment bag.

Another object of our invention is to provide a machine which will be simple and reliable in operation and which will operate with great rapidity.

Other objects of our invention will be set forth in the following description and drawings, which illustrate a preferred embodiment thereof, it being understood that the above general statements of the objects of our invention is intended to generally explain it, without limiting it in any manner.

Figs. 1 and 1$^a$ are a joint plan view of the machine.

Figs. 2 and 2$^a$ are a joint side elevation of the machine.

Fig. 3 is a section on the line 3—3 of Fig. 1.

Fig. 3$^a$ is a section on the line 3$^a$—3$^a$ of Fig. 1$^a$.

Fig. 4 is a plan view of the scoring mechanism

Fig. 7 is a plan view of the pressing mechanism.

Fig. 8 is a section on the line 8—8 of Fig. 7.

Fig. 9 is a plan view of the cutting mechanism.

Fig. 10 is a section on the line 10—10 of Fig. 9.

Fig. 11 is a section on the line 11—11 of Fig. 9.

Fig. 12 is a plan view of the folding mechanism.

Fig. 13 is a section on the line 13—13 of Fig. 12.

Fig. 14 is a section on the line 14—14 of Fig. 12.

Fig. 15 is a perspective view of the blank utilized for making the improved bag.

Fig. 16 is a bottom view of the blank after it has been cut.

Fig. 17 shows the blank shown in Fig. 16 after the glue has been applied.

Fig. 18 shows the blank illustrated in Fig. 17 after the ends have been bent over.

Fig. 19 shows the blank illustrated in Fig. 18 after the score lines have been formed.

Fig. 20 is a section on the line 20—20 of Fig. 19.

Fig. 21 is a perspective view showing the blank illustrated in Fig. 16 and partially opened.

Garment bags of the side-opening type have hitherto been made by hand because they were so large, and made of such stiff paper, that no satisfactory machine has previously been devised to make them.

The general operation of our machine can be seen in Figs. 15–21 inclusive.

The machine operates on a blank B having a top 260, a bottom 261, and a pleated side having two layers of paper, so that the blank includes four layers of paper. This blank is open at one side and at the edges thereof. The closed pleated side of the blank B is shown in Fig. 21.

In the first operation of our machine and as shown in Fig. 21, a rectangular strip of paper is cut from the bottom 261 and from the two layers of the pleated closed side, leaving the top 260 uncut. This is done simultaneously at both edges of the blank B, as shown in Fig. 16, so that the edges of the bottom 261 are defined by the lines 263. At the same time, superposed score lines 262 are formed in the four layers of the blank B, as shown in Fig. 21, said score lines being intermediate the edge lines 263 of the narrowest layer of the blank.

The exposed edge portions of the top 260, and the edge portions of the bottom 261, are covered with any suitable adhesive, which may be designated as glue, said glue extending up to the score lines 262. This is shown in Fig. 17.

Then, as shown in Fig. 18, the edges of the blank, including all four layers thereof, are bent over on the score lines 262, to secure the folded-over edges of the blank to the shortest layer thereof, as shown in Fig. 20. The completed bag has very strong and reinforced edges, consisting of four layers of paper. The blank is also provided with score lines 265 in the body thereof, so that it can be readily folded.

In order to perform the operations above mentioned, the machine is provided with a horizontally reciprocated feeding mechanism which first moves the bag to the cutting mechanism and then moves it to the gluing mechanism. This feeding mechanism has first and second pairs of feed fingers.

A third pair of feed fingers then move the blank to the folding mechanism.

A fourth pair of feed fingers then move the blank to a belt feed which passes the blank through the scoring mechanism for making the score lines 265.

Pressing mechanism is also provided for pressing down the turned-over edges of the bag.

First feeding mechanism.

Figure 1:
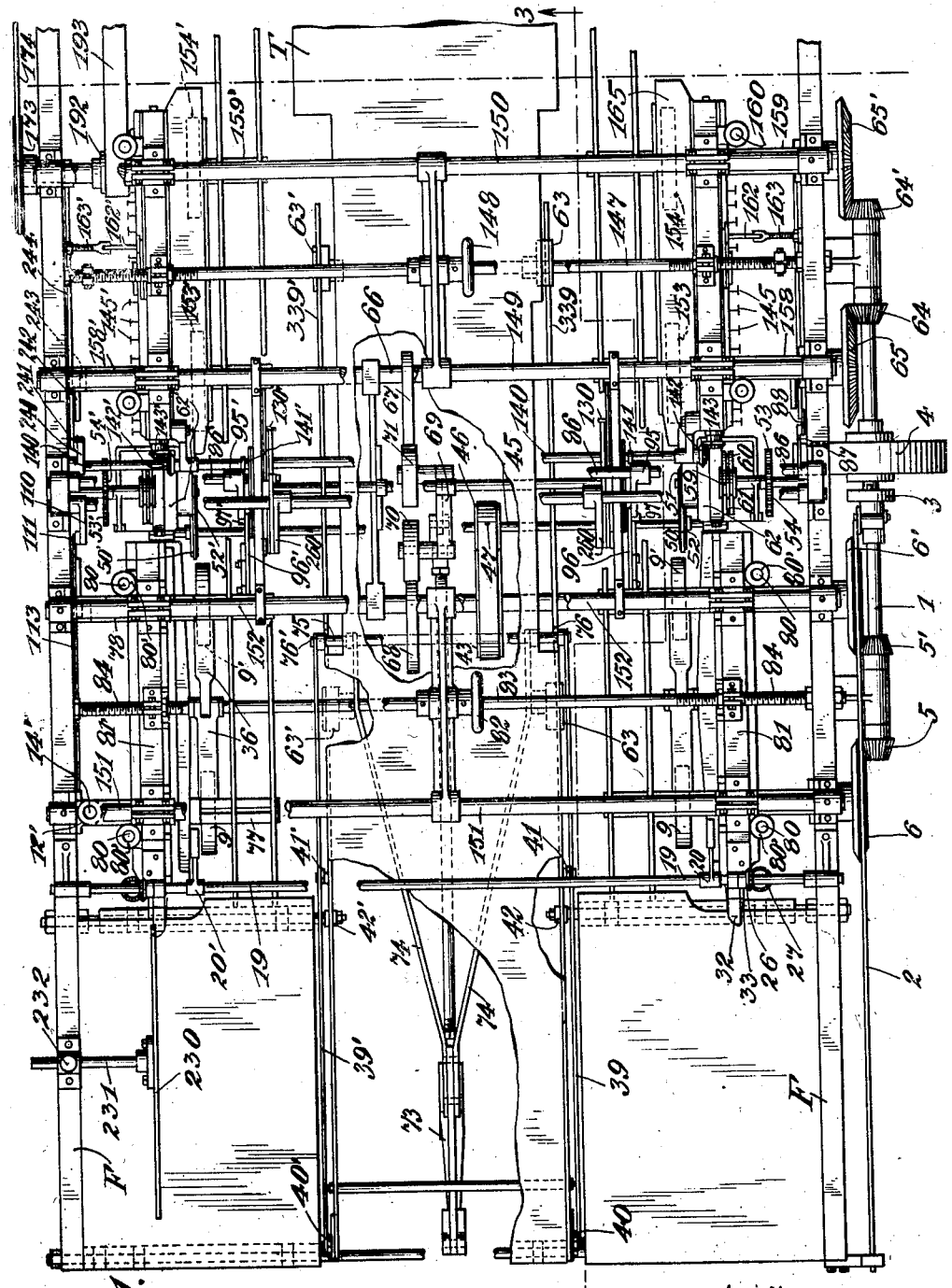

As shown in Fig. 1, longitudinal feed rods 339 and 339' are slidably mounted in guides 63 and 63' connected to the frame F of the machine. The rods 339 and 339' are respectively provided with recesses 76 and 76' in which a rod 75 is located, so that said rod 75 has a limited movement in said recesses 76 and 76', with respect to rods 339 and 339'.

As shown in Fig. 1, the rods 339 and 339' are provided with a front or first set of feed fingers 40 and 40' and with a second set of feed fingers 41 and 41'.

These feed fingers are similarly mounted and actuated. Thus, as shown in Fig. 3, the feed finger 40 is pivotally connected to rod 339 at the bottom thereof, and the link 39 pivoted to transverse rod 75 is connected to feed finger 40 above the pivot thereof. A second link 39' is provided, which corresponds to link 39. Hence, when the rod 75 is rearwardly actuated, the feed fingers 40 and 40', and 41 and 41' are turned to the vertical position, so that their tops project above the table T of the machine. The blanks B are placed upon the front of the table T. When the rod 75 is forwardly actuated, the fingers 40 and 40', and 41 and 41' are turned until their tops are below the table T. The table T is provided with longitudinal slots in which the said feed fingers move.

As shown in Figs. 1 and 3, the rod 75 is connected by means of links 74 to a lever 73, which is connected by a link 72 to the bottom of a lever 69. As shown in Fig. 3, the lever 69 is pivoted to transverse rod 44. Lever 69 is provided with rollers 70 and 71 which co-operate with cams 68 and 67, mounted on the transverse shafts 8' and 66.

As shown in Fig. 2, the transverse shaft 8' is provided with a large bevel gear 6', which meshes with a small bevel gear 5' mounted on the drive shaft 1, which is provided with a drive pulley 4. The transverse shaft 66 is provided with a large bevel gear 65 which meshes with a small bevel gear 64 on the drive shaft 1. The links 39 and 39' slide upon rollers 42 and 42'.

A blank is placed upon the table T with the pleated side adjacent the front of the machine, and perpendicular to the drive shaft 1.

The first movement of the rods 339 and 339' causes the fingers 40 and 40' to move the blank to the cutting mechanism, and the next movement of said rods 339 and 339' causes the fingers 41 and 41' to move the blank to the pasting mechanism.

The rods 339 and 339' are actuated by the transverse rod 75. The cams 68 and 67 shown in Fig. 3 turn lever 69 in the counterclockwise direction. This causes the rod 75 to be moved to the right, or to the rear of recesses 76 and 76'. This initial movement of rod 75 actuates links 39 and 39' to raise the first feed fingers 40 and 40', until they project into the feeding position. When rod 75 contacts with rear walls of recesses 76 and 76' it rearwardly pushes rods 339 and 339' so that the blank B is moved to the cutting mechanism. The cams 68 and 67 now operate to move the rod 75 forwardly until it contacts with the front walls of recesses 76 and 76'. This causes the links 39 and 39' to turn the first set of feed fingers 40 and 40', and also the second set of feed fingers 41 and 41', until they are in the inoperative position. As soon as rod 75 contacts with the front walls of recesses 76 and 76' it operates the rods 339 and 339' forwardly in their return stroke to their initial position. In the next rearward stroke or movement of the rods 339 and 339', the second set of feed fingers 41 and 41' engage the blank, which has been operated upon by the cutting mechanism, so that the cut blank is moved to the glue-applying mechanism.

The third pair of feed fingers comprise a pair of members 97 and 97', shown in Figs. 1 and 3, said fingers 97 and 97' having similar means for actuating them. As shown in Fig. 3, finger 97 is pivoted at $a$ to a slide $b$ which is suitably mounted on a longitudinal guide member. Finger 97 is connected by link $c$ to a lever $d$ which is pivoted to slide $b$. Slide $b$ is provided with two pins to limit the movement of bell-crank lever $d$. A spring (not shown) is provided to keep to lever $d$ against the upper pin. The lever $d$ is connected by link 96 to arm 95 which is connected to transverse shaft 86.

As shown in Fig. 2, shaft 86 is provided with an arm 87, which is connected by link 88 to a lever 89 pivotally mounted on shaft 66'. Shaft 66' can turn freely with respect to lever 89.

As shown in Fig. 13, the lever 89 is provided with a roller 94, which is operated by a cam 93 on the shaft 66. A spring is shown in Fig. 13 for forcing roller 94 against cam 93.

The parts for actuating the finger 97' correspond to those associated with the finger 97. Thus the link 96' corresponds to link 96, and the arm 95' corresponds to arm 95.

As shown in Fig. 3, the slides $b$ are provided with resilient extensions e, which cause the front of the blank to move under them, when the blank is pushed by the second set of fingers 41 and 41'. Upon their return stroke, namely, when said fingers move towards the front of the machines, the fingers 97 and 97' are depressed by depressing members 141 and 141' mounted on shaft 140, to prevent any backward movement of the blank.

As shown in Fig. 1, shaft 140 is provided with bevel gears 142 and 142', which mesh with bevel gears 143 and 143', mounted on the folder shafts 144, one of which is shown in Fig. 14. The operation of the folder shafts will be later described. Hence the third set of fingers 97 and 97' are reciprocated to engage the front edge of the blank after it has been cut, and adhesive has been applied thereto, to move the blank rearwardly through the folding mechanism. When said fingers 97 and 97' are rearwardly actuated, they are depressed to engage the front edge of the blank, and when they are forwardly actuated, they are raised to release the blank.

The fourth set of fingers comprise members 130 and 130' shown in Fig. 1 and Fig. 3. These fingers 130 and 130' are pivotally mounted on slides similar to slides b, and they are associated with link 350 and a bell-crank member similar in operation to those associated with fingers 97 and 97'. This fourth set of fingers is operated by arms 260 connected to shaft 85. As shown in Figs. 1 and 3, shaft 85 has an arm 110 which is connected by link 111 to a lever 113 pivotally mounted on shaft 8, so that shaft 8 can turn freely with respect to lever 113. Lever 113 is operated by cam 172 mounted on shaft 8'. The operation of fingers 130 and 130' is the same as that of fingers 97 and 97'.

The four sets of reciprocating fingers operate to move the blank along the table T in four intermittent movements.

*Cutting mechanism.*

This comprises two pairs of associated longitudinal blades, and two pairs of associated lateral blades. The lower longitudinal and lateral blades of each pair are reciprocated.

As shown in Figs. 10 and 11, lower longitudinal blades 15 are provided with lateral extensions or cutting blades 37.

As shown in Fig. 11, for example, the lower cutting blades are mounted in carriages which can slide upon vertical guides 80, said guides being secured to sleeves 80' which form part of the adjustable supports 81 and 81' for the upper knives, which have longitudinal edges 16 and lateral edges 38.

As shown in Figs. 1 and 14, the supports for the upper blades are slidably mounted upon transverse rods 151 and 152.

Said adjustable supports 81 and 81' for the upper knives have central internally threaded nut members, which co-operate with the oppositely threaded ends 84 of an adjusting shaft 83, provided with a hand wheel 82.

As shown in Fig. 11, the guides 80 have nuts at the lower ends thereof, to limit the lower movement of the lower blades.

As shown in Fig. 11, the carriages for the lower blades slide on projections 77 and 78 of transverse rails 11 and 11', which are downwardly pulled by springs 10 and 10'. The rails 11 and 11' are slidably guided in sleeves 12 connected to the frame F of the machine.

As shown in Figs. 10 and 11, the rails 11 and 11' have depending projections, which abut levers 36, pivotally mounted on transverse rod 34. Levers 36 are provided with rollers 35 and 35', which co-operate with cams 9 and 9' on shafts 8 and 8'.

The lower knives have lower scoring blades 17 associated therewith and the upper knives have recessed scoring members 18 associated therewith.

Hence, our machine is readily adjustable for blanks of different widths, and it can cut rectangular strips from three of the layers of the bag, while forming the score lines 262.

When the blank B is inserted, its closed pleated side is towards or adjacent the operator. The first feeding fingers 40 and 40' engage the closed side of the blank, and move the blank rearwardly until the closed pleated side thereof is underneath the lateral cutting members 37 and 38. The rails 11 and 11' are now raised. The bottom cutting blades 15 now operate to form longitudinal cuts in the blank and the lateral cutting members 37 and 38 act in a scissor-like manner to sever a rectangular strip from the bottom 261 of the blank, while the top 260 of the blank B remains uncut. The longitudinal scoring blades 17 cooperate with recessed members 18 to form the superposed score lines 262 in the top 260, the bottom 261 and the intermediate layers of the pleated side of the blank. The cutting mechanism transforms the uncut and unscored blank shown in Fig. 15, to the cut and scored blank shown in Fig. 21.

*Front guide mechanism.*

Since the blank must be fed into the machine while its closed pleated side is towards the operator or the front of the machine, movable guide means are provided to properly present the blank to the action of the cutting blades.

As shown in Figs. 1, 3, 9 and 10, the respective guides 30 are provided with top guide blades 31 and 31', middle inclined blades 32 and 32' and bottom blades 33 and 33'. As each blank is fed forwardly to the cutting mechanism, the top blades 31 and 31' project between the top layer 260 of the blank B and the adjacent plait layer of the closed side; the middle blades 32 and 32' project between the bottom layer 261 and the adjacent plait layer of the closed side of the blank; and the bottom blades 33 and 33' are located below the bottom layer 261. Hence, the top layer 260 passes above the upper cutting blades, but below the upper scoring members 18, so that the top layer 260 remains uncut, but is scored.

After the cutting operation and the first scoring have been performed, the guides 30 must be laterally moved to clear the advancing closed and plaited side of the blank.

For this purpose, the guide 30, for example, is mounted upon a short vertical shaft 29 mounted in a bearing 28, as shown in Fig. 10. The shaft 29 is provided with a bevel gear 27 which meshes with a bevel gear 26 mounted upon a lateral shaft 19. Shaft 19 has an arm 25 connected by link 24 to a lever 21 which is pivotally mounted upon the shaft 8' so that shaft 8' can turn freely with respect to lever 21. As shown in Fig. 10, lever 21 has a roller 23 and is actuated by cam 22 of shaft 8. The mechanism for actuating the guide 30' is similar to that used for actuating guide 30. Hence, after the blank has been cut and scored as before mentioned, the guides 30 and 30' are turned laterally to clear the closed plaited side of the blank B, to permit the further feeding of said blank.

Fingers 20 and 20' are mounted on shaft 19 for downwardly pressing the two plait portions of the closed side of the blank so that the cutting mechanism will operate upon them. Said fingers 20 and 20' operate as the guides 30 are swung laterally.

Glue applying mechanism.

As shown in Figs. 2 and 13, glue boxes 49 are provided. The shaft 8' has a pulley 43 which is connected by a belt 47 to a pulley 46 on a shaft 45. Shaft 45 has sprockets 50 and 50' connected by chains 52 and 52' to smaller sprockets 51 on shafts 48 located with the glue boxes 49. As shown in Fig. 13, the shafts 48 have large sprockets 53 which mesh with smaller sprockets 54 mounted on shafts which carry the top rollers 59 (see Fig. 12) of the glue applying mechanism. As shown in Fig. 1, bottom rollers 60 having grooves 61 dip into the glue in the glue boxes 49. Suitable blades 61 are provided for removing excess glue from the rollers 60. Guides 62 and 62' are provided for the glue boxes 49.

The glue boxes 49 are laterally adjustable in the guides 62 and they can be held in adjusted position by any suitable means. As shown in Fig. 3 the glue boxes 49 are slidably mounted on the cross rods 44 and they can be held in suitable adjusted position by means of ordinary set screws. The sprockets 54 are mounted on pivoted levers 54' which are connected to the frames of the respective paste pots and the sprockets 53 are slidably adjustable along their shafts 48 so that they can be caused to mesh with the upper sprockets 54 in the adjusted position of the paste pots.

Likewise, it may be generally remarked that whenever the adjustment of the various parts requires the movements of gears, that such gears are slidably keyed to their respective shafts. The upper and lower rollers 59 and 60 are continuously turned to apply glue to the edges of the blank as shown in Fig. 17.

Folding mechanism.

As shown for example, in Fig. 14, the left-hand edge of the blank is fed by the mechanism before described so that said left-hand edge rests upon the top folder blades 165. These top folder blades 165 are urged outwardly or away from the longitudinal central line of the machine by means of springs 167. The folder blades 165 are connected to vertical mounts $165^m$ which are provided with slidable bearings 365 which slide upon lateral rods 365'. In order to prevent the mounts $165^m$ from turning on their bearings, the bottom of the member 165 is forked and this forked bottom slides upon the lateral rod 168. The lateral rod 168 is connected to the vertical support 170 which is suitably connected to frame F of the machine.

The member $165^m$ is moved against the force of the tension spring 167 by means of the lever 162 which is pivotally connected to the laterally adjustable support 163. As shown in Fig. 14 the member $165^m$ is provided with an inwardly directed wedge 166 which co-operates with the roller 164 on lever 162. Hence, when the lever 162 is moved downwardly from the position shown in Fig. 14 the tension spring 167 is free to slide the mount $165^m$ outwardly or away from the central longitudinal line of the machine. When the lever 162 is moved upwardly this forces the mount $165^m$ outwardly. The lever 162 projects through a slot in the presser bar support 161 so that as the presser bar support 161 is moved up and down, the lever 162 is simultaneously moved although there is a slight relative free motion between them. The members 161 are mounted upon rails 158 and 158' which are slidably connected to the frame of the machine, like the rails for the cutting mechanism above mentioned. For example, and as shown in Fig. 14 the rail 158 is provided with a depending member 160 which slides in a sleeve connected to the frame of the machine. The rail 158' has a member 160' corresponding to the member 160, as shown in Fig. 13. The rails 158 and 158' are downwardly urged by springs 171 and 172. These rails are vertically reciprocated by levers 156 which are pivotally connected to the cross rods 155. Said levers 156 are provided with rollers as shown in Fig. 13 and these rollers co-operate with cams 153 and 154 connected to the shafts 66 and 66'. As shown in Fig. 1 the shafts 66 and 66' are provided with large bevel gears 65 and 65' which co-operate with small bevel gears 64 and 64' on the main shaft 1.

The upper supports 146 for the finger shafts 144 are slidably mounted upon lateral rods 149 and 150. As shown in Fig. 1, for example, said supports 146 are provided with oppositely threaded nut members which co-operate with the threaded ends of a shaft 147 provided with an adjusting hand wheel 148. The members 161 can be vertically reciprocated upon guide rods depending from the members 146 so that the folding mechanism can be adjusted like the cutting mechanism before mentioned. The left-hand and right-hand finger shafts 144 are provided with folding fingers 145 and 145'. As shown in Fig. 1 the left-hand and right-hand finger shafts 144 are provided with bevel gears 143 and 143' which mesh with bevel gears 142 and 142' upon the transverse shaft 140. As shown in Figs. 1 and 3, the shaft 140 is provided with an arm 240 which is pivotally connected to the link 241. The link 241 is connected to a lever 244 loosely mounted upon the shaft 66'. The lever 244 is provided with a roller 243 which is actuated by the cam 242 upon the shaft 66. The member 161 is provided with an insert R made of rubber or other suitable soft material.

When the edges of the blank are deposited upon the folder bars 165, said folder bars are first moved outwardly so as to be above the members R, while the supports 161 are moved downwardly. The fingers 145 and 145' are simultaneously operated by rocking the shafts 144 to first fold the blank along the lines 262. The members 161 are then moved upwardly while the mounts 165$^m$ and the folder bars 165 are moved inwardly towards the central longitudinal line of the machine by the levers 162 and the inserts R press the folded over edges of the bag firmly into position. These inserts R firmly press the inturned ends of the blank against the adjacent horizontal faces of supports 146 to produce the member shown in Fig. 20.

*Second pressing mechanism.*

The next operation of the feeding mechanism, in which the fourth set of fingers 130 and 130' operate, causes an edge of the blank to be inserted between the belts 181 and 178 which pass around the four rollers shown in Fig. 2$^a$. The frictional contact between the adjacent runs of the said belts 181 and 178 is sufficient to cause the said belts to be simultaneously operated. One of these four rollers is provided with a sprocket 175 as shown in Fig. 1$^a$, which is connected by means of a chain 174 to a sprocket 173 (shown in Fig. 1) upon the shaft 66'. The top rollers connected to the top belt 181 are of considerable weight and they are mounted upon levers 179 and 180 so that there is considerable pressure between the adjacent runs of the two belts. The lower belt 178 passes around the block 217. The top rollers press upon the folded edges of the blank shown in Fig. 20, the blank being moved rearwardly by belts 178 and 181.

*Scoring mechanism.*

Figure 5:
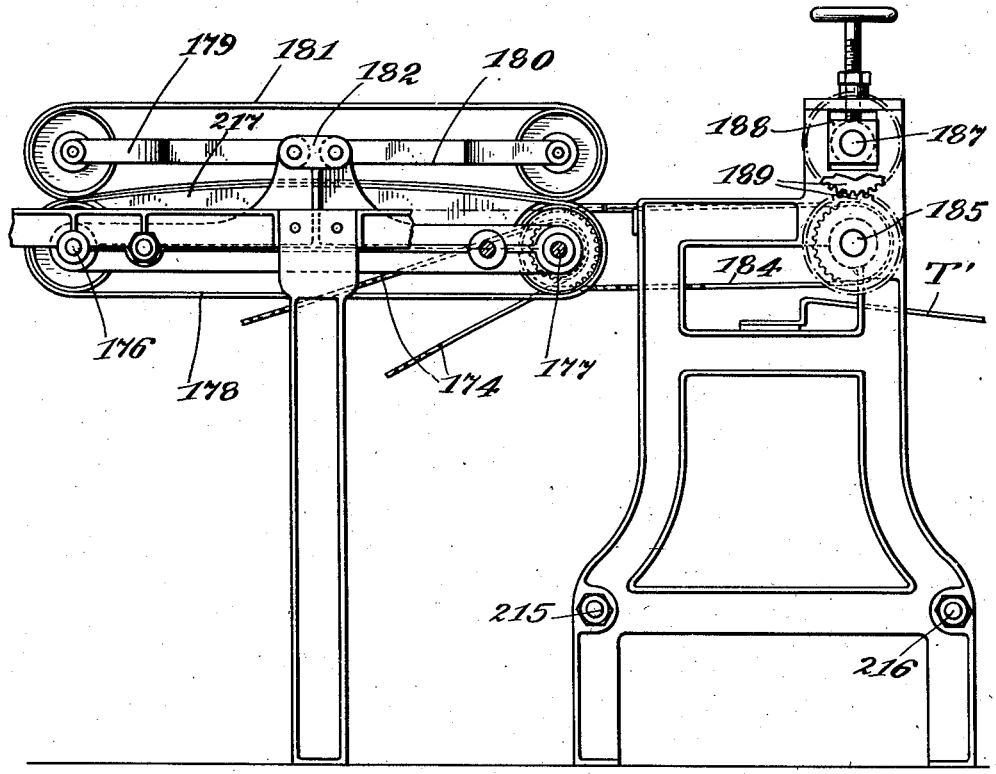
Fig. 5 is a side view of the device shown in Fig. 4.
Figure 6:
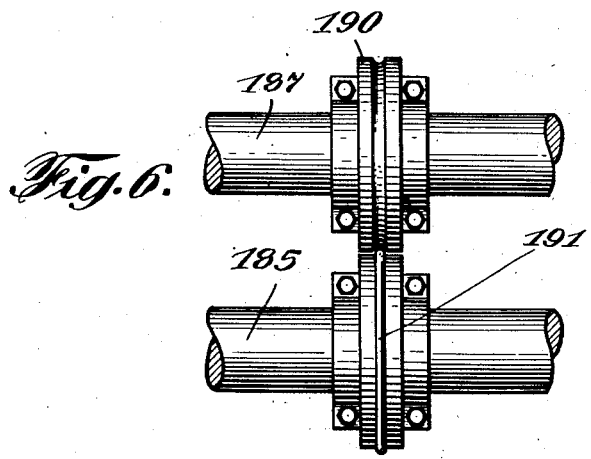
Fig. 6 is a detail view of the scoring device.

As shown in Figs. 4 and 6 for example, the scoring mechanism comprises lower and upper shafts 185 and 187 which are respectively provided with a plurality of scoring ridges 191 and with recessed scoring members 190. As shown in Fig. 5 for example, the shafts 185 and 187 are provided with co-operating sprockets 189. As shown in Fig. 1$^a$ for example, the shaft 185 has a sprocket 186 which is driven by a chain 184 connected to the sprocket 183. The upper shaft 187 is provided with an adjustable bearing 187 which can be moved up and down by a suitable hand operated adjustment so as to regulate the pressure between the scoring members. This scoring mechanism produces the score lines 265 shown in Fig. 19. The belts 178 and 181 feed the rear end of the blank to the members 191 and 190, which feed and score the blank.

*Third pressing mechanism.*

As the rear edge of the blank is fed rearwardly by the belts 178 and 181 and the members 191 and 190 the rear end of the blank is gripped by the belts 220 and 302, which are mounted upon a series of heavy vertically movable rollers 205 as shown in Fig. 2$^a$. These rollers are provided with shafts 210 which can move vertically in the slots 204 of the bars 203 which are held rigidly in a suitable frame. The upper belt 220 co-operates with the lower belt 302 which moves around a series of lower rollers 200 which have no vertical movement. The front roller 200 of belt 30$^2$ has a sprocket 196 on the shaft 199 thereof which is connected by a chain 197 to a sprocket 195 on the shaft 198. The shaft 198 has a belt 193 passing around a pulley 192 on the shaft 66'. The frame of the third pressing mechanism is re-inforced by tie rods 211 and 212. This last-mentioned pressing mechanism aids in pressing down the folded ends of the blank, shown in Fig. 20, so that they will be firmly pasted or glued into the position there shown.

The table T has a rear extension T'. A supply of blanks B can be kept in a holder T$^2$.

The front of the table T is provided with laterally adjustable longitudinal guide members 230, mounted on transverse rods 231, which are adjustably held by set screws 232 in guides provided in the frame F.

The frame F is reinforced by rods 7 and a rod 2 is provided for actuating a clutch 3 which connects the shaft 1 with the drive pulley 4.

The complete operation of the machine is as follows:

The operator takes a blank B from the magazine or holder T² and places this upon the table T between the guide members 230. That part of the machine which is shown at the top of Fig. 1 may be designated as the left-hand side of the machine, and that part of the machine which is shown at the bottom of Fig. 1 may be designated as the right-hand side of the machine. The operator places the blank B in position with the closed and pleated side adjacent him. This closed and pleated side is placed a little behind the front position of the first feed fingers 40 and 40'. The operator then manipulates the rod 2 to set the machine in operation. The members 72, 73 and 74 are thus operated to reciprocate the rod 75. The rod 75 is first moved rearwardly for a short distance until the first feed fingers 40 and 40' are moved to the vertical position to engage the closed and pleated side of the blank. The rod 75 and the members 339 and 339' are now moved in unison towards the rear of the machine. The first feed fingers 40 and 40' move the blank until the closed and pleated side thereof is substantially adjacent the position of the second pair of feed fingers 41 and 41' which is indicated in Fig. 1. Since the members 339 and 339' have a stroke of predetermined length, it does not make any difference if the operator places the blank upon the table T with the closed and pleated side of said blank a little behind the position of the fingers 40 and 40' indicated in Fig. 1.

As the blank B is fed rearwardly during the first intermittent movement thereof, the top blades 31 and 31' pass underneath the top layer 260 of the blank. At the end of the first intermittent movement of the blank, the top blades 31 and 31' are between the top layer 260 of the blank, and the adjacent plait layer of the closed side; the middle blades 32 and 32' are between the bottom layer 261 of the blank and the adjacent or lower plait layer of the closed side; and the bottom plaits 33 and 33' are located below the bottom layer 261 of the blank.

The mechanism previously described causes the guides 30 and 30' to rock about respective vertical axes, and said blades are in the longitudinal position as the blank is fed forwardly in its first intermittent movement. Said blades remain in said longitudinal position while the cams 9 and 9' operate to raise the lower cutting blades. The cutting mechanism operates to cut out rectangular strips from three of the layers of the blank, as previously described, and to form the score lines 262. The guides 30 and 30' are now turned laterally to clear the blank B. The next stroke of the members 339 and 339' causes the fingers 41 and 41' to engage the blank and to impart the second intermittent movement thereto. During the second intermittent movement of the blank, it is passed through the glue-applying mechanism.

The closed side of the blank is now engaged by the said fingers 97 and 97' which impart the third intermittent movement thereof so that each longitudinal edge of the blank coincides with the fingers 145 provided at each side of the machine.

The members 161 are now caused to descend thus permitting the folder blades 165 to be moved underneath the supports 146. The shafts 144 are now actuated so that the fingers 145 fold the respective longitudinal edges of the blank inwardly and under the blades 165. The fingers 145 are now located in the position shown in Fig. 14 and the supports 161 are caused to rise thus forcing the blades 165 to the inoperative position shown in Fig. 14. The inserts R now press upwardly upon the inwardly folded flaps of the blank B so that these are pressed until they are parallel with the body of the blank.

The fourth set of feed fingers 130 and 130' now operate to impart the fourth intermittent movement to the blank B, which is slid along the table T so that the rear edge of the said blank is engaged by the belts 178 and 181. These belts feed the blank rearwardly while the inwardly folded sides are subjected to the additional pressure of the pivotally mounted rollers around which the belt 181 passes. These belts 178 and 181 now feed to the members 190 and 191 which feed the blank rearwardly while producing the additional score lines 265. The rear edge of the blank is now engaged by the belts 220 and 302 and the inturned edges of the blank are now subjected to a final pressure and the operation of the machine is then complete.

We claim:—

1. In a bag-making machine, the sub-combination of cutting mechanism adapted to sever strips from the edge portions of a blank, adhesive-applying mechanism aligned with said cutting mechanism, longitudinally slidable feed rods having two pairs of feed fingers pivoted thereto, a table on which said blank is adapted to rest and having longitudinal slots in which said fingers are adapted to move, links pivotally connected to said fingers above their pivotal connections to said feed rods, and means adapted to reciprocate said links.

2. In a bag-making machine, the sub-combination of cutting mechanism adapted to sever strips from the edge portions of a blank, adhesive-applying mechanism aligned with said cutting mechanism, longitudinally slidable feed rods having two pairs of feed fingers pivoted thereto, a table on which said blank is adapted to rest and having longitudinal slots in which said fingers are adapted to move, links pivotally connected to said fingers above their pivotal connections to said feed rods, and means adapted to reciprocate said links, the free ends of said links being located in recesses of said feeding rods.

3. In a bag-making machine, the sub-combination of cutting mechanism adapted to cut strips from the edge portions of a blank presented thereto, and guide means comprising blades located at different levels and adapted to guide layers of paper to said cutting mechanism, each said guide means also having a guide blade adapted to guide a layer of paper above said cutting mechanism, so that when a blank comprising a plurality of layers is fed to said cutting mechanism, one of its layers remains uncut.

4. In a bag-making machine, the sub-combination of cutting mechanism comprising two pairs of longitudinal cutting blades, a pair of lateral cutting blades associated with each pair of longitudinal cutting blades, and guide means for each set of longitudinal and lateral cutting blades, each guide means comprising a pair of guide blades adapted to guide layers of paper between said cutting blades, and a third guide blade adapted to guide a layer of paper above said cutting blades.

5. In a bag-making machine having a frame, the sub-combination of feeding mechanism adapted to feed a blank to cutting mechanism, said cutting mechanism comprising two pairs of longitudinal and superposed cutting blades, pairs of superposed and lateral cutting blades respectively associated with said longitudinal blades, laterally adjustable supports carrying the upper blades, vertically movable supports for the lower blades connected to said laterally adjustable supports, lateral and vertically movable rails connected to the frame of the machine and on which said vertically movable supports are adapted to slide, and means adapted to vertically reciprocate said rails.

6. In a bag-making machine, the sub-combination of cutting mechanism adapted to cut strips from the edge portions of a blank presented thereto, and guide means comprising blades located at different levels and adapted to guide layers of paper to said cutting mechanism, each said guide means also having a blade adapted to guide a layer of paper above said cutting mechanism, and scoring means associated with said cutting mechanism, and adapted to score all the layers of paper guided by said blade.

7. In a bag-making machine having a frame, cutting mechanism comprising two pairs of longitudinal and superposed cutting blades, pairs of superposed and lateral cutting blades respectively associated with said longitudinal cutting blades, supports carrying the upper cutting blades, scoring members connected to said supports above the upper cutting blades, vertically movable supports for the lower cutting blades, said vertically movable supports having scoring members connected thereto and adapted to cooperate with said first-mentioned scoring members, guide means adapted to guide paper between said cutting blades, and guide means adapted to guide paper between said upper cutting blades and the scoring members associated therewith.

8. In a bag-making machine, the sub-combination of cutting mechanism adapted to cut edge portions from a blank presented thereto, upper blades adapted to guide a layer of paper above said cutting mechanism, and inclined blades located below said upper blades and adapted to deflect a second layer of paper located below said first-mentioned layer to the cutting mechanism.

9. In a bag-making machine, the sub-combination of cutting mechanism adapted to cut edge portions from a blank presented thereto, laterally movable guide means adapted to guide paper to said cutting mechanism, and means adapted to laterally actuate said guide means, so that said guide means can clear the closed side of a blank guided thereby.

10. In a bag-making machine, the sub-combination of cutting mechanism adapted to cut edge portions from a blank presented thereto, pivoted guide means adapted to guide paper to said cutting mechanism, and means adapted to oscillate said guide means.

11. In a bag-making machine, the sub-combination of cutting mechanism adapted to cut edge portions from a blank presented thereto, laterally movable guide means adapted to guide layers of paper to said cutting mechanism, presser means adapted to press down upon the layers of paper guided to said cutting mechanism, and means adapted to laterally actuate said guide means.

12. In a bag making machine, the sub-combination of cutting mechanism adapted to cut edge portions from a blank presented thereto, laterally movable guide means adopted to guide layers of paper to said cutting mechanism, movable presser means adapted to press down upon the layers of paper guided to said cutting mechanism, and means adapted to simultaneously operate said presser means and laterally actuate said guide means.

13. In a bag-making machine, the sub-combination of cutting mechanism adapted to cut edge portions from a blank presented thereto, guide means mounted on turnable shafts, and adapted to guide paper to said cutting mechanism, a shaft geared to the first mentioned shafts, and presser means mounted on said second mentioned shaft and adapted to press down upon the paper guided to said cutting mechanism.

14. In a bag-making machine, folding mechanism comprising an upper presser bar, a vertically movable support having a lower presser bar connected thereto, a laterally movable folder bar associated with said support, a shaft having folder fingers adapted to cooperate with said folder bar and mechanism adapted to move said folder bar towards said fingers in order to turn said fingers to fold a sheet around said folder bar and to then retract said folder bar and said fingers and to then move said lower presser bar towards said upper presser bar.

15. In a bag-making machine, folding mechanism comprising an upper presser bar, a lower presser bar mounted on a vertically movable support, a shaft having folding fingers, a laterally moving folding bar, and means for actuating said folding bar operable by the movement of said support.

16. In a bag-making machine, folding mechanism comprising an upper presser bar, a lower presser bar mounted on a vertically movable support, a shaft having folding fingers, a laterally movable folding bar, a spring adapted to move said folding bar between said presser bars, a lever projecting through a slot in said support, so that said lever is oscillated by the movement of the support, and means operated by said lever to actuate said support.

17. In a bag-making machine, folding mechanism comprising a folding bar, a shaft having folding fingers, pressing members adapted to press the folded-over part of a bag, and a laterally movable folding bar movable to and from a position intermediate said pressing members.

18. In a bag-making machine having a frame, laterally adjustable folding mechanism comprising lateral rods mounted on the frame, upper pressing bar supports slidably mounted on said frame, means adapted to hold said supports in adjusted position, lower presser bar supports slidably connected to said upper supports, laterally movable folder bars associated with said presser bars, laterally adjustable actuating means for said folding bars, and shafts having folding fingers connected thereto.

19. In a bag-making machine having a frame, a laterally movable folding bar, an upper presser bar, a lower presser bar mounted on a vertically movable support, a shaft having folding fingers, a spring adapted to move said folding bar between said presser bars, a lever projecting through a slot in said support, so that said lever is oscillated by the movement of the support, a roller mounted on the lever, and a downwardly inclined wedge connected to the folder bar and adapted to be operated by the upward movement of the said lever.

20. A bag-making machine comprising pairs of longitudinal and lateral cutting blades, the blades of each pair being superposed, means adapted to reciprocate the lower cutting blades, guide means adapted to guide a blank having a plurality of layers of paper to said cutting blades so that one of said layers of paper passes above said cutting blades, scoring mechanism associated with said cutting blades and adapted to score all the layers of paper of the said blank, adhesive-applying mechanism associated with the said cutting blades and adapted to apply adhesive to the edges of the top and bottom layers of paper of the said blank, folding mechanism adapted to turn the portions of the said layers to which adhesive has been applied, scoring mechanism adapted to score the body of the blank, pressing mechanism adapted to press the inturned edges of the blank against the body portion thereof, and feed means adapted to urge the blank through the before mentioned mechanisms.

In testimony whereof we affix our signatures.

ABRAHAM STONE.
MAX FROST.